United States Patent
Sekiya et al.

(10) Patent No.: US 8,967,470 B2
(45) Date of Patent: Mar. 3, 2015

(54) INFORMATION EXCHANGING METHOD USING TWO-DIMENSIONAL CODE

(71) Applicant: Disco Corporation, Tokyo (JP)

(72) Inventors: Kazuma Sekiya, Tokyo (JP); Munehiro Shinada, Tokyo (JP); Satoshi Odaira, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 13/872,529

(22) Filed: Apr. 29, 2013

(65) Prior Publication Data

US 2013/0299576 A1    Nov. 14, 2013

(30) Foreign Application Priority Data

May 9, 2012    (JP) .................................. 2012-107399

(51) Int. Cl.
*G06F 19/00* (2011.01)
*G06Q 10/08* (2012.01)
*G06K 19/06* (2006.01)

(52) U.S. Cl.
CPC ........ *G06Q 10/087* (2013.01); *G06K 19/06037* (2013.01)
USPC .................. 235/385; 235/462.01; 235/462.09

(58) Field of Classification Search
USPC ........................ 235/385, 462.09, 462.01, 375
See application file for complete search history.

(56) References Cited

U.S. PATENT DOCUMENTS

2013/0186954 A1*    7/2013    Denny .......................... 235/375

FOREIGN PATENT DOCUMENTS

JP    2000-268122    9/2000

* cited by examiner

*Primary Examiner* — Ahshik Kim
(74) *Attorney, Agent, or Firm* — Greer Burns & Crain Ltd.

(57) ABSTRACT

An information exchanging method using a two-dimensional code and a two-dimensional code reader. An original sheet is prepared by writing a first two-dimensional code and a second two-dimensional code. The first two-dimensional code is readable by the code reader, whereas the second two-dimensional code is unreadable by the code reader. A monochrome copy sheet is prepared by monochromatically copying the original sheet, so that the monochrome copy sheet includes a third two-dimensional code as a monochrome copy of the first two-dimensional code and a fourth two-dimensional code as a monochrome copy of the second two-dimensional code. Accordingly, the third two-dimensional code is unreadable by the code reader, whereas the fourth two-dimensional code is readable by the code reader. Information exchange is performed by using the original sheet and the monochrome copy sheet.

2 Claims, 5 Drawing Sheets

INFORMATION EXCHANGING METHOD USING TWO-DIMENSIONAL CODE

BACKGROUND OF THE INVENTION

1. Field of the Invention

The present invention relates to a method of exchanging information by reading a two-dimensional code with a two-dimensional code reader.

2. Description of the Related Art

In the distribution of product, a two-dimensional code capable of encoding information at a high density is sometimes used to facilitate product management. A two-dimensional code reader shown in Japanese Patent Laid-open No. 2000-268122, for example, may be used to read the two-dimensional code. This two-dimensional code reader is composed of a body portion and a grip portion. The front surface of the body portion is provided with a two-dimensional code reading opening in which an image sensor is incorporated.

In ordering a product, an orderer usually prepares an order sheet by writing thereon product information identifying the product, such as a product number and a product name, number information identifying the number of items constituting the product, and other information such as a desired delivery date for the product. Then, the orderer sends this order sheet to an order receiver. On the other hand, the order receiver checks the stock of the product according to the information written on the order sheet and confirms the number of items that can be delivered. Then, the order receiver delivers the product to the orderer by the desired delivery date.

For the purpose of facilitating product management, the orderer writes a two-dimensional code including the product information and the number information on the order sheet and sends this order sheet to the order receiver. On the other hand, the order receiver delivers the product together with this order sheet (invoice) to the orderer. Then, the orderer uses a two-dimensional code reader to read the two-dimensional code written on the order sheet sent from the order receiver, thereby recording that the product has been completely delivered. In this manner, the orderer performs product management.

SUMMARY OF THE INVENTION

However, the order receiver does not always hold the number of items in stock in accordance with the order sheet. Accordingly, when the number of items in stock is not enough, the order receiver delivers the product in stock in advance and subsequently delivers the remaining number of items so as to meet the required number of items ordered. Thus, the order receiver performs partial delivery of the product. In the case that the order receiver performs such partial delivery of the product with the order sheet having the two-dimensional code, there is a possibility that although the product has been partially delivered, the orderer may erroneously record that the product has been completely delivered as the result of reading of the two-dimensional code written on the order sheet by the use of the two-dimensional code reader. This causes a problem such that product management at the orderer may be confused.

It is therefore an object of the present invention to provide an information exchanging method which can eliminate the problem that the orderer may erroneously record complete delivery of the product in spite of the fact that the product has been partially delivered.

In accordance with an aspect of the present invention, there is provided an information exchanging method for exchanging information by the use of a two-dimensional code and a two-dimensional code reader, the information exchanging method including an original sheet preparing step of writing a first two-dimensional code and a second two-dimensional code both configured in color on a sheet to prepare an original sheet, the first two-dimensional code being composed of a portion having a first color and a portion having a second color, the first color being the same as the color of light to be emitted from the two-dimensional code reader, the second color being a complementary color to the first color and having the same lightness as that of the first color, the second two-dimensional code being composed of a portion having a fourth color and a portion having a third color, the fourth color being the same as the color of light to be emitted from the two-dimensional code reader, the third color being the same as the fourth color and having a lightness different from that of the fourth color, the first two-dimensional code being readable by the two-dimensional code reader, the second two-dimensional code being unreadable by the two-dimensional code reader; a monochrome copy sheet preparing step of monochromatically copying the original sheet to prepare a monochrome copy sheet, the monochrome copy sheet including a third two-dimensional code as a monochrome copy of the first two-dimensional code and a fourth two-dimensional code as a monochrome copy of the second two-dimensional code, the third two-dimensional code being unreadable by the two-dimensional code reader, the fourth two-dimensional code being readable by the two-dimensional code reader; and an information exchanging step of exchanging the information by using the original sheet and the monochrome copy sheet.

Preferably, the sheet is an order sheet for ordering a product; in the original sheet preparing step, the first two-dimensional code includes at least product information identifying the product and number information identifying the number of items of the product to be delivered; the second two-dimensional code includes at least product information identifying the product and partial delivery information identifying partial delivery of the product to be delivered; and the information exchanging step includes an ordering step of sending the original sheet from an orderer to an order receiver to thereby order the product; a complete delivery step of completely delivering the product together with the original sheet from the order receiver to the orderer; a partial delivery step of partially delivering the product together with the monochrome copy sheet from the order receiver to the orderer; a complete delivery recording step of reading the first two-dimensional code written on the original sheet by using the two-dimensional code reader operated by the orderer in the case of performing the complete delivery step, and then recording that the product ordered has been completely delivered according to the information included in only the first two-dimensional code; and a partial delivery recording step of reading the fourth two-dimensional code written on the monochrome copy sheet by using the two-dimensional code reader operated by the orderer in the case of performing the partial delivery step, and then recording that the product ordered has been partially delivered according to the information included in only the fourth two-dimensional code.

According to the present invention, the first two-dimensional code written on the original sheet is composed of a portion having a first color and a portion having a second color, wherein the first color is the same as the color of light to be emitted from the two-dimensional code reader, and the second color is a complementary color to the first color and has the same lightness as that of the first color. Accordingly, the first two-dimensional code can be read by the two-dimensional code reader, but a monochrome copy of the first two-dimensional code cannot be read by the two-dimensional code reader. On the other hand, the second two-dimensional code written on the original sheet together with the first two-dimensional code is composed of a portion having a fourth color and a portion having a third color, wherein the fourth color is the same as the color of light to be emitted from the two-dimensional code reader, and the third color is the same as the fourth color and has a lightness different from that of the fourth color. Accordingly, the second two-dimensional code cannot be read by the two-dimensional code reader, but a monochrome copy of the second two-dimensional code can be read by the two-dimensional code reader. Accordingly, by properly using the original sheet and the monochrome copy sheet, any one of the first and second two-dimensional codes is used to allow the information exchange, so that the information intended to be transmitted can be reliably transmitted. That is, the information exchange can be smoothly performed without confusion.

In the case that the original sheet is an order sheet, the first two-dimensional code and the second two-dimensional code are created for the case of completely delivering the product and the case of partially delivering the product, respectively. In the case of completely delivering the product, the original sheet is sent as an invoice from the order receiver to the orderer. In the case of partially delivering the product, the monochrome copy sheet obtained by monochromatically copying the original sheet is sent as an invoice from the order receiver to the orderer. Accordingly, the orderer can clearly distinguish between the complete delivery and the partial delivery by only reading any readable two-dimensional code, thereby preventing the confusion of product management.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
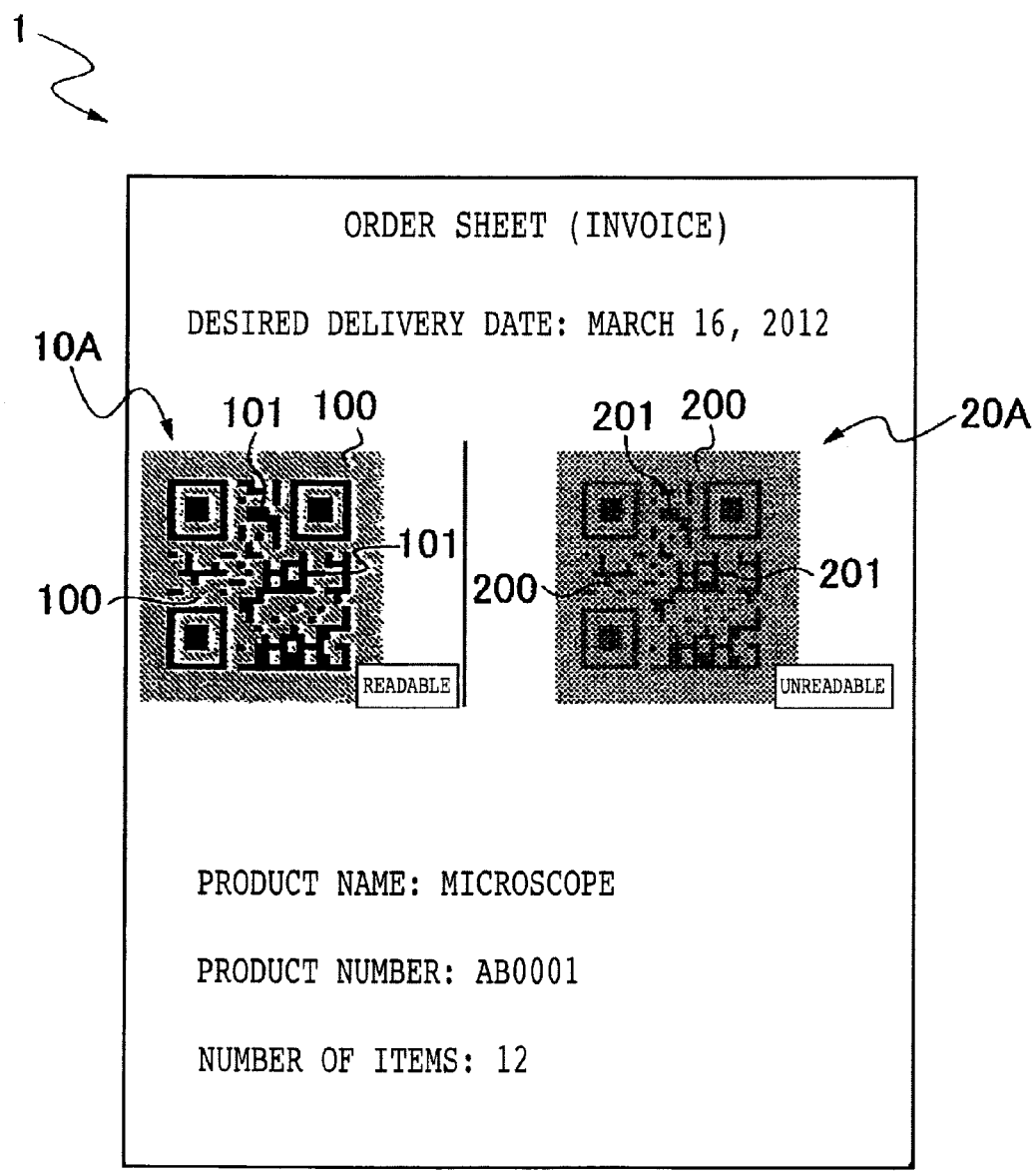
FIG. 1 is a plan view showing the configuration of an original sheet having a first two-dimensional code and a second two-dimensional code.

The written sheet shown in FIG. 1 is an original sheet 1 on which a first two-dimensional code 10A and a second two-dimensional code 20A both configured in color are written. The original sheet 1 functions as a product order sheet to be used by an orderer of a product and functions also as an invoice to be sent from an order receiver to the orderer in the case of completely delivering the product from the order receiver to the orderer.

As shown in FIG. 1, the first two-dimensional code 10A is composed of a portion having a first color 100 and a portion having a second color 101. The first color 100 is the same as the color of light to be emitted from a two-dimensional code reader. The second color 101 is a complementary color to the first color 100 and has the same lightness (luminosity) as that of the first color 100. The two-dimensional code reader has a light source for emitting red light, so that the color of light to be emitted from the two-dimensional code reader is red. Accordingly, the first color 100 is red and the second color 101 is green which is a complementary color to red.

The second two-dimensional code 20A shown in FIG. 1 is composed of a portion having a third color 200 and a portion having a fourth color 201. The fourth color 201 is the same as the color of light to be emitted from the two-dimensional code reader. The third color 200 is the same as the fourth color 201 and has a lightness different from that of the fourth color 201. That is, the fourth color 201 is red and the third color 200 is the same color as the fourth color 201 but different in lightness. In the example shown in the figure, the third color 200 is red lighter than the fourth color 201.

Figure 2:
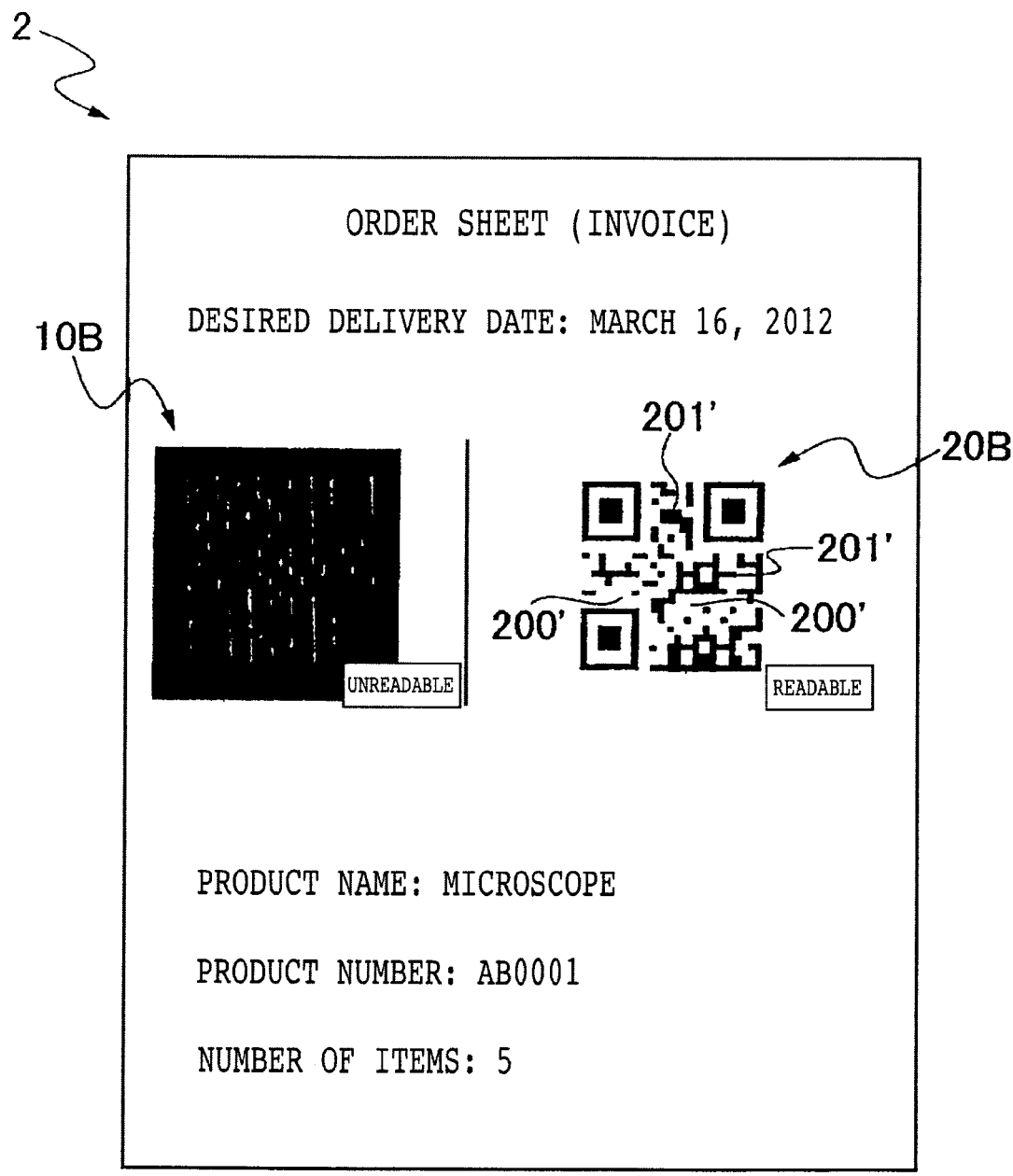
FIG. 2 is a plan view showing the configuration of a monochrome copy sheet obtained by monochromatically copying the original sheet having a first two-dimensional code and a second two-dimensional code.

The written sheet shown in FIG. 2 is a monochrome copy sheet 2 prepared by monochromatically copying the original sheet 1 shown in FIG. 1. The monochrome copy sheet 2 is a sheet to be sent from the order receiver to the orderer in the case of partially delivering the product from the order receiver to the orderer. As shown in FIG. 2, the monochrome copy sheet 2 includes a third two-dimensional code 10B formed as a monochrome copy of the first two-dimensional code 10A and a fourth two-dimensional code 20B formed as a monochrome copy of the second two-dimensional code 20A. The third two-dimensional code 10B has a low contrast as a whole, whereas the fourth two-dimensional code 20B has a high contrast as a whole.

There will now be described a method of exchanging product information between the orderer and the order receiver by using the original sheet 1 shown in FIG. 1 and the monochrome copy sheet 2 shown in FIG. 2, according to the flowchart shown in FIG. 5 with reference to FIGS. 3 and 4.

The exchange of product information by the two-dimensional code is started at an orderer 3 (step S50). First, the orderer 3 performs an original sheet preparing step (step S51). More specifically, the orderer 3 shown in FIG. 3 creates the first two-dimensional code 10A by combining the first color 100 of red which is the same color as that of the red light to be emitted from a two-dimensional code reader 5 and the second color 101 of green which is a complementary color to the first color 100 and has the same lightness as that of the first color 100, thereby encoding at least product information such as a product name "microscope" and a product number "AB0001" and number information "12" indicating the number of items of product to be delivered. Then, the orderer 3 writes this first two-dimensional code 10A on the original sheet 1.

In the first two-dimensional code 10A, the product information can be detected by the two-dimensional code reader 5. More specifically, when a red light is applied from the two-dimensional code reader 5 to the first two-dimensional code 10A configured by the first color 100 of red and the second color 101 of green which is complementary to red, the red light from the two-dimensional code reader 5 is absorbed by the second color 101 of green complementary to red and reflected by the first color 100 of red. Accordingly, the two-dimensional code reader 5 detects the reflected light from the first color 100 to read the first two-dimensional code 10A, thus detecting the product information.

Figure 3:
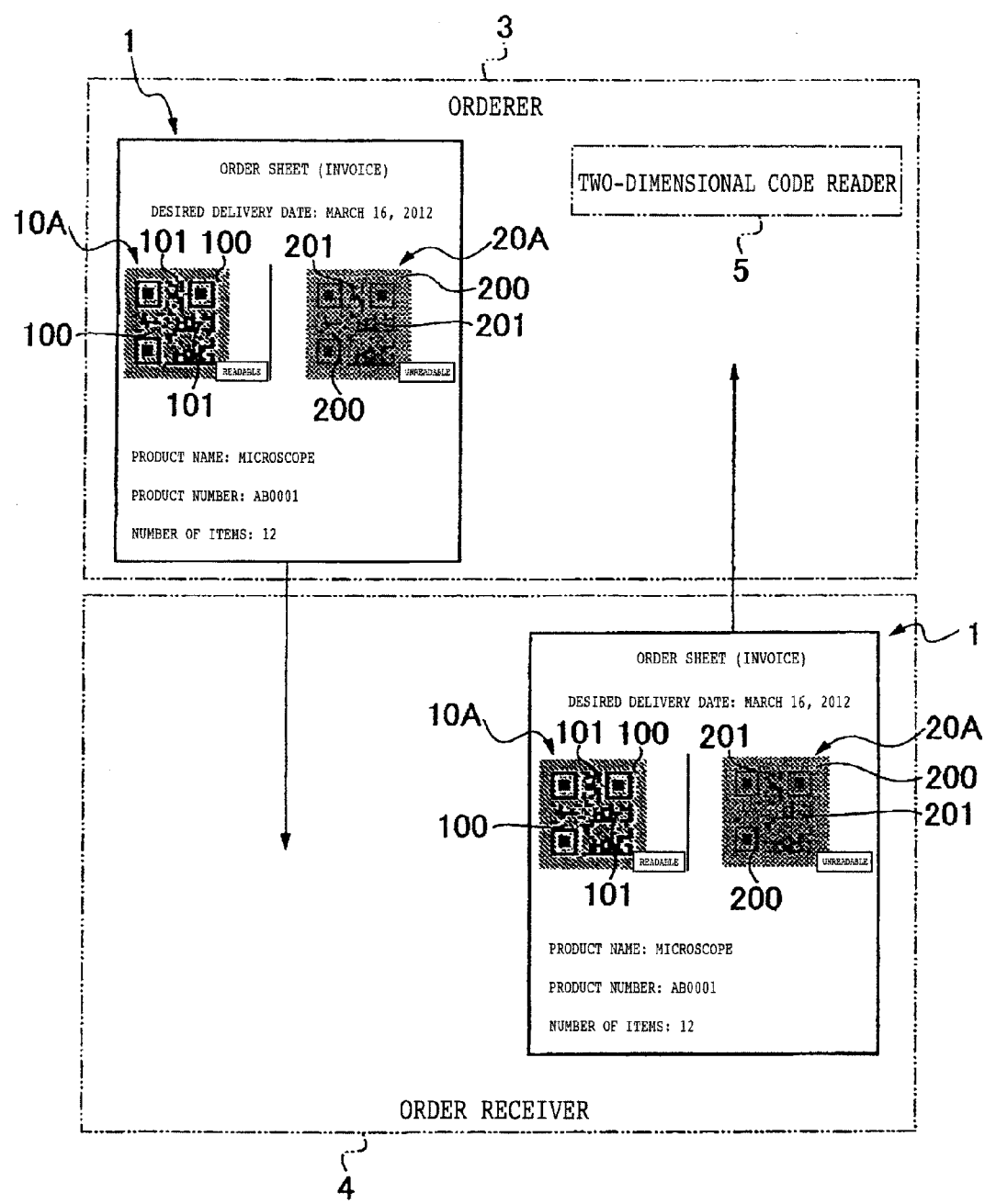
FIG. 3 is a block diagram for illustrating an information exchanging step in the case of completely delivering a product.

Further, in preparation for partial delivery by an order receiver 4, the orderer 3 shown in FIG. 3 creates the second two-dimensional code 20A by combining the fourth color 201 of red which is the same color as that of the red light to be emitted from the two-dimensional code reader 5 and the third color 200 of red different in lightness from the fourth color 201, thereby encoding at least product information such as a product name "microscope" and a product number "AB0001" and partial delivery information indicating that the product is to be partially delivered by the order receiver 4. Then, the orderer 3 writes this second two-dimensional code 20A on the original sheet 1.

In the second two-dimensional code 20A, the product information cannot be detected by the two-dimensional code reader 5. More specifically, both the third color 200 and the fourth color 201 constituting the second two-dimensional code 20A are the same color as that of the light to be emitted from the two-dimensional code reader 5. Accordingly, both the third color 200 and the fourth color 201 reflect the red light applied from the two-dimensional code reader 5. As a result, the second two-dimensional code 20A cannot be read by the two-dimensional code reader 5, so that the product information in the second two-dimensional code 20A cannot be detected.

The orderer 3 also writes a desired delivery date in addition to the first two-dimensional code 10A and the second two-dimensional code 20A including the product information on the original sheet 1, thus preparing the original sheet 1. Further, in order that the order receiver 4 can grasp the information written on the original sheet 1, the orderer 3 also writes the product information including the product name and the product number and the number of items of product ordered in addition to the first two-dimensional code 10A and the second two-dimensional code 20A on the original sheet 1. In this manner, the original sheet preparing step is finished (step S51).

Figure 5:
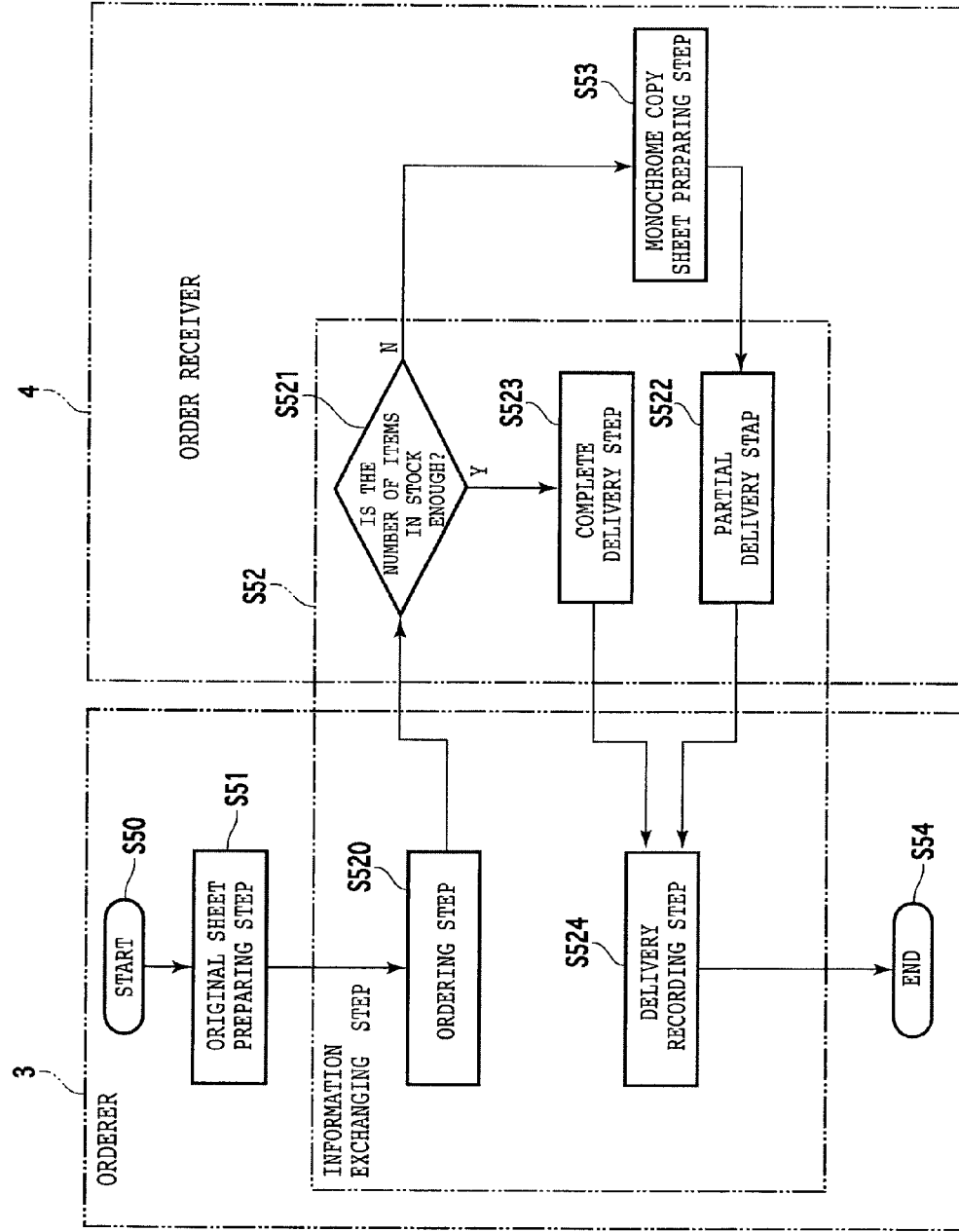
FIG. 5 is a flowchart showing the procedure of an information exchanging method for exchanging information on the product.

Thereafter, as shown in FIG. 5, an information exchanging step is performed between the orderer 3 and the order receiver 4 (step S52). This information exchanging step is divided into substeps to be described below.

(1) Ordering Step

The orderer 3 sends the original sheet 1 including at least the first two-dimensional code 10A and the second two-dimensional code 20A to the order receiver 4, thus ordering the product (step S520). The original sheet 1 may be sent through a communication line such as the Internet.

(2) Complete Delivery Step

The order receiver 4 checks whether or not the number of items (e.g., 12) of product ordered in stock is enough according to the information written on the original sheet 1 (step S521). In the case that the number of items of product ordered in stock is enough, the order receiver 4 sends the original sheet 1 as an invoice to the orderer 3 and completely delivers the product to the orderer 3, that is, deliver all of the items ordered (step S523).

(3) Partial Delivery Step

In the case that the number of items of product ordered in stock is not enough, a monochrome copy sheet preparing step (step S53) is performed in preparation for partial delivery of the product.

In this monochrome copy sheet preparing step, the order receiver 4 performs monochrome copying of the original sheet 1 shown in FIG. 1 to prepare the monochrome copy sheet 2 shown in FIG. 2. In the first two-dimensional code 10A shown in FIG. 4, the lightness of the first color 100 is the same as that of the second color 101, so that the third two-dimensional code 10B as a monochrome copy of the first two-dimensional code 10A is low in contrast and therefore the information included in the third two-dimensional code 10B cannot be recognized by the two-dimensional code reader 5. Accordingly, when the order receiver 4 sends the monochrome copy sheet 2 to the orderer 3 in partially delivering the product to the orderer 3, the orderer 3 cannot read the third two-dimensional code 10B by using the two-dimensional code reader 5.

On the other hand, the fourth two-dimensional code 20B is a monochrome copy of the second two-dimensional code 20A configured by the third color 200 and the fourth color 201 which are both red and different in lightness. Accordingly, a monochrome copy 200' of the third color 200 and a monochrome copy 201' of the fourth color 201 have high contrast. Furthermore, since the monochrome copies 200' and 201' have no complementary color to red, the information included in the fourth two-dimensional code 20B can be read by the two-dimensional code reader 5.

Figure 4:
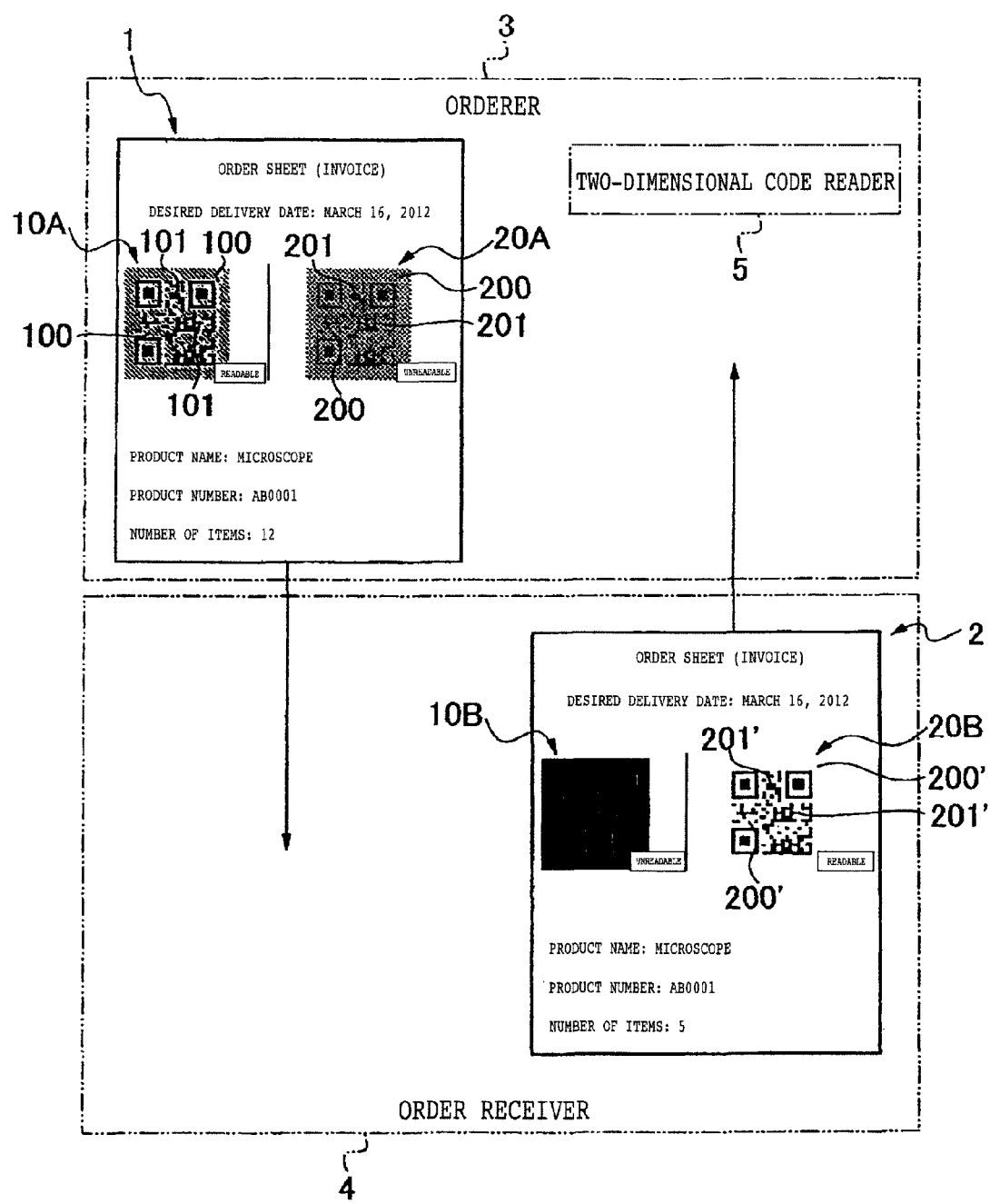
FIG. 4 is a block diagram for illustrating the information exchanging step in the case of partially delivering the product.

Further, in order that the orderer 3 can grasp the number of items partially delivered, the order receiver 4 shown in FIG. 4 writes the number of items to be partially delivered (e.g., 5) on the monochrome copy sheet 2. In this manner, the monochrome copy sheet preparing step (step S53) is finished.

Thereafter, the order receiver 4 sends the monochrome copy sheet 2 rather than the original sheet 1 to the orderer 3 and partially delivers the items of product whose number (e.g., 5) is smaller than the number of items ordered (step S522). The monochrome copy sheet 2 may be sent through a communication line such as the Internet.

(4) Delivery Recording Step

In the case that the complete delivery step (step S523) mentioned above is performed by the order receiver 4, the orderer 3 shown in FIG. 3 uses the two-dimensional code reader 5 to read the first two-dimensional code 10A written on the original sheet 1 delivered from the order receiver 4 and then records the complete delivery on a hard disk or the like in a computer. At this time, the second two-dimensional code 20A written on the original sheet 1 cannot be read by the two-dimensional code reader 5. Accordingly, there is no possibility that the orderer 3 may erroneously recognize partial delivery.

In the case that the partial delivery step (step S522) mentioned above is performed by the order receiver 4, the orderer 3 shown in FIG. 4 uses the two-dimensional code reader 5 to read the fourth two-dimensional code 20B written on the monochrome copy sheet 2 delivered from the order receiver 4 and then records the partial delivery on a hard disk or the like in a computer. By clearly checking the partial delivery, the orderer 3 can manage the delivery of the remaining items of product ordered. The third two-dimensional code 10B written on the monochrome copy sheet 2 cannot be read by the two-dimensional code reader 5. Accordingly, there is no possibility that the orderer 3 may erroneously recognize complete delivery. In this manner, the orderer 3 can clearly distinguish between complete delivery and partial delivery, thus finishing the delivery processing (step S54).

As described above, two kinds of two-dimensional codes individually including the information indicative of complete delivery and the information indicative of partial delivery are written on the original sheet 1. The first two-dimensional code is configured by the colors such that the information can be read in the original condition, whereas the information cannot be read in the monochrome copy condition. In contrast, the second two-dimensional code is configured by the colors such that the information cannot be read in the original condition, whereas the information can be read in the monochrome copy condition. In the case of complete delivery, only the first two-dimensional code is used to perform the delivery processing, whereas in the case of partial delivery, only the second two-dimensional code is used to perform the delivery processing. Accordingly, the orderer can clearly distinguish between complete delivery and partial delivery in managing the product, thereby preventing the confusion of product management.

While the exchange of information on order and delivery between the orderer and the order receiver has been described in the above preferred embodiment, the present invention is applicable also to any other fields where information exchange is performed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An information exchanging method for exchanging information by the use of a two-dimensional code and a two-dimensional code reader, said information exchanging method comprising:
    an original sheet preparing step of writing a first two-dimensional code and a second two-dimensional code both configured in color on a sheet to prepare an original sheet, said first two-dimensional code being composed of a portion having a first color and a portion having a second color, said first color being the same as the color of light to be emitted from said two-dimensional code reader, said second color being a complementary color to said first color and having the same lightness as that of said first color, said second two-dimensional code being composed of a portion having a fourth color and a portion having a third color, said fourth color being the same as the color of light to be emitted from said two-dimensional code reader, said third color being the same as said fourth color and having a lightness different from that of said fourth color, said first two-dimensional code being readable by said two-dimensional code reader, said second two-dimensional code being unreadable by said two-dimensional code reader;
    a monochrome copy sheet preparing step of monochromatically copying said original sheet to prepare a monochrome copy sheet, said monochrome copy sheet including a third two-dimensional code as a monochrome copy of said first two-dimensional code and a fourth two-dimensional code as a monochrome copy of said second two-dimensional code, said third two-dimensional code being unreadable by said two-dimensional code reader, said fourth two-dimensional code being readable by said two-dimensional code reader; and
    an information exchanging step of exchanging the information by using said original sheet and said monochrome copy sheet.

2. The information exchanging method according to claim 1,
    wherein said sheet is an order sheet for ordering a product;
    in said original sheet preparing step, said first two-dimensional code includes at least product information identifying said product and number information identifying the number of items of said product to be delivered;
    said second two-dimensional code includes at least product information identifying said product and partial delivery information identifying partial delivery of said product to be delivered; and
    said information exchanging step includes:
        an ordering step of sending said original sheet from an orderer to an order receiver to thereby order said product;
        a complete delivery step of completely delivering said product together with said original sheet from said order receiver to said orderer;
        a partial delivery step of partially delivering said product together with said monochrome copy sheet from said order receiver to said orderer;
        a complete delivery recording step of reading said first two-dimensional code written on said original sheet by using said two-dimensional code reader operated by said orderer in the case of performing said complete delivery step, and then recording that said product ordered has been completely delivered according to the information included in only said first two-dimensional code; and
        a partial delivery recording step of reading said fourth two-dimensional code written on said monochrome copy sheet by using said two-dimensional code reader operated by said orderer in the case of performing said partial delivery step, and then recording that said product ordered has been partially delivered according to the information included in only said fourth two-dimensional code.

* * * * *